US012563079B2

(12) United States Patent
Debenedetti et al.

(10) Patent No.: US 12,563,079 B2
(45) Date of Patent: Feb. 24, 2026

(54) SYSTEMS, METHODS, AND COMPUTER PROGRAMS FOR DETERMINING A VULNERABILITY OF A NETWORK NODE

(71) Applicant: Telefonaktiebolaget LM Ericsson (publ), Stockholm (SE)

(72) Inventors: Paolo Debenedetti, Albissola Marina (IT); Gaetano Patria, San Prisco (IT); Luca Baldini, Rome (IT); Giuseppe Celozzi, Naples (IT); Davide Massino, Genoa (IT); Daniele Gaito, Naples (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 174 days.

(21) Appl. No.: 18/279,858

(22) PCT Filed: Mar. 5, 2021

(86) PCT No.: PCT/EP2021/055631
    § 371 (c)(1),
    (2) Date: Aug. 31, 2023

(87) PCT Pub. No.: WO2022/184275
    PCT Pub. Date: Sep. 9, 2022

(65) Prior Publication Data
    US 2024/0146756 A1      May 2, 2024

(51) Int. Cl.
    *H04L 9/40*          (2022.01)
(52) U.S. Cl.
    CPC ............................... *H04L 63/1433* (2013.01)
(58) Field of Classification Search
    CPC ........................... H04L 63/1433; G06F 21/577
    See application file for complete search history.

(56) References Cited

U.S. PATENT DOCUMENTS

2016/0234237 A1      8/2016  Thakar et al.
2016/0241580 A1*     8/2016  Watters ................... H04L 63/20
                             (Continued)

FOREIGN PATENT DOCUMENTS

CN          107835161 A  *  3/2018  ......... H04L 63/0807
CN          113536321 A  *  10/2021  ......... G06F 21/6227
                             (Continued)

OTHER PUBLICATIONS

International Search Report and Written Opinion issued in International Application No. PCT/EP2021/055631 dated Nov. 29, 2021 (12 pages).
                             (Continued)

*Primary Examiner* — Sarah Su
(74) *Attorney, Agent, or Firm* — Rothwell, Figg, Ernst & Manbeck, P.C.

(57)          ABSTRACT

A method for determining a vulnerability of a network node. The method includes a master security management node obtaining security patch information regarding one or more security patches installed on the network node. The method also includes the master security management node using the security patch information to determine a first vulnerability value for the network node. The method also includes the master security management node obtaining a set of other vulnerability values for the network node, wherein each other vulnerability value was determined by different security management node. The method also includes the master security management node determining, based on the set of other vulnerability values, whether a consensus regarding the vulnerability level of the network node has been reached. If the master security management node determines that a consensus regarding the vulnerability level of the network node has been reached, the first vulnerability value is assigning to the network node.

23 Claims, 5 Drawing Sheets

(56)     References Cited

U.S. PATENT DOCUMENTS

| | | | | |
|---|---|---|---|---|
| 2016/0373478 A1* | 12/2016 | Doubleday | ............... | G06F 8/65 |
| 2017/0093824 A1* | 3/2017 | Shulman | ............. | H04L 63/1433 |
| 2017/0289134 A1* | 10/2017 | Bradley | ............... | H04L 63/105 |
| 2019/0311133 A1* | 10/2019 | Sheridan | ................. | G06F 21/57 |
| 2020/0372154 A1* | 11/2020 | Bacher | ............... | G06F 16/1834 |
| 2021/0067536 A1* | 3/2021 | Mylrea | ................. | H04L 9/3239 |

FOREIGN PATENT DOCUMENTS

| | | | | | |
|---|---|---|---|---|---|
| CN | 114095187 A | * | 2/2022 | .......... | H04L 63/302 |
| CN | 116915505 A | * | 10/2023 | | |
| CN | 120217211 A | * | 6/2025 | ............ | G06N 20/00 |
| EP | 3522488 A1 | * | 8/2019 | ........... | G06F 21/552 |
| KR | 20240057786 A | * | 5/2024 | | |
| WO | 2022/128126 A1 | | 6/2022 | | |

OTHER PUBLICATIONS

Huang, C., et. al., "RepChain: A Reputation-Based Secure, Fast, and High Incentive Blockchain System via Sharding", IEEE Internet of Things Journal, vol. 8, No. 6, Mar. 15, 2021 (pp. 4291-4304).
CVE—Common Vulnerabilities and Exposures (CVE), Jan. 31, 2021 https://web.archive.org/web/20210131163946/http://cve.mitre.org (2 pages).

* cited by examiner

100

120

101

102

103

Node

SWA

103

Node

SWA

. . . .

110

121

104

Miner

105

Miner

. . . .

106

Miner

200

400

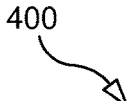

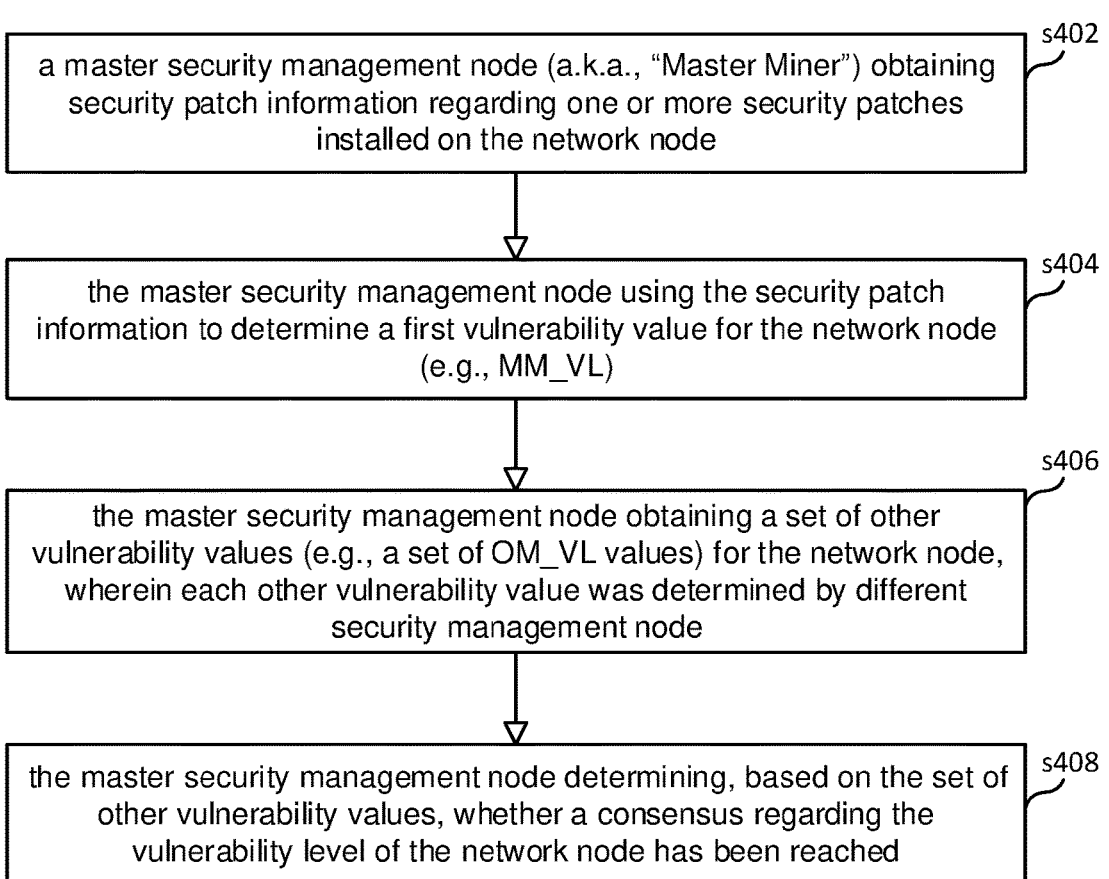

| s402 |
| a master security management node (a.k.a., "Master Miner") obtaining security patch information regarding one or more security patches installed on the network node |

| s404 |
| the master security management node using the security patch information to determine a first vulnerability value for the network node (e.g., MM_VL) |

| s406 |
| the master security management node obtaining a set of other vulnerability values (e.g., a set of OM_VL values) for the network node, wherein each other vulnerability value was determined by different security management node |

| s408 |
| the master security management node determining, based on the set of other vulnerability values, whether a consensus regarding the vulnerability level of the network node has been reached |

FIG. 4

SYSTEMS, METHODS, AND COMPUTER PROGRAMS FOR DETERMINING A VULNERABILITY OF A NETWORK NODE

CROSS REFERENCE TO RELATED APPLICATIONS

This application is a 35 U.S.C. § 371 National Stage of International Patent Application No. PCT/EP2021/055631, filed 2021 Mar. 5.

TECHNICAL FIELD

This disclosure relates to methods, devices, computer programs and carriers related to determining a vulnerability of a network node.

BACKGROUND

For a given network node, it may be possible to determine the vulnerability of the network node based on the software updates that have been installed on the network node. The number of software vulnerabilities that can be exploited increases with increasing usage of Open Source software components. System administrators can receive notice of these vulnerabilities through bulletins, alerts, and feeds. Once so notified, it is then up to the system administrator to fix the vulnerability by, typically, downloading and installing a software update (a.k.a., "security fix" or "security patch"). Accordingly, the lack of security fixes may increase the vulnerability of the device and reduce its security and trust for running mission critical applications.

Common Vulnerabilities and Exposure (CVE)® is a list of entries—each containing an identification number, a description, and at least one public reference—for publicly known cybersecurity vulnerabilities. CVE Entries are used in numerous cybersecurity products and services from around the world, including the U.S. National Vulnerability Database (NVD). Some particular vulnerabilities, called Speculative Execution Vulnerabilities can affect the Linux Kernel and BIOS microcode like for example there are some families of speculative vulnerabilities like Spectre, Meltdown, Lazy FP, etc. For each family one or more CVE can be present. Table 1 below illustrates an example of a CVE list.

available to verify and report the installed patches on a multitude of network nodes in a public network, but these existing solutions depend on common patch management tools and do not provide a decentralized method to assess the vulnerability of network nodes participating in the network.

Accordingly, in one aspect there is provide a method for determining a vulnerability of a network node. The method includes a master security management node (a.k.a., Master Miner) obtaining security patch information regarding one or more security patches installed on the network node. The method also includes the master security management node using the security patch information to determine a first vulnerability value for the network node. The method also includes the master security management node obtaining a set of other vulnerability values for the network node, wherein each other vulnerability value was determined by different security management node. The method also includes the master security management node determining, based on the set of other vulnerability values, whether a consensus regarding the vulnerability level of the network node has been reached. If the master security management node determines that a consensus regarding the vulnerability level of the network node has been reached, the first vulnerability value is assigning to the network node.

In another aspect there is provided a computer program comprising instructions which when executed by processing circuitry of a security management node causes the security management node to perform the method. In another aspect there is provided a carrier containing the computer program, wherein the carrier is one of an electronic signal, an optical signal, a radio signal, and a computer readable storage medium.

In another aspect there is provided a security management node, where the security management node is adapted to perform the method of any embodiments disclosed herein. In some embodiments, the security management node includes processing circuitry; and a memory containing instructions executable by the processing circuitry, whereby the security management node is operative to perform the methods disclosed herein.

TABLE 1

| CVE | Alias | Micro-code update needed | Kernel cmdline parameters to toggle off | Links |
|---|---|---|---|---|
| CVE-2017-5753 (1) | Spectre V1 | | N/A | https://www.suse.com/support/kb/doc/?id=7022512 |
| CVE-2017-5715 (1) | Spectre V2 | Y | nospectre_v2nospec | https://www.suse.com/support/kb/doc/?id=7022512 |
| CVE-2017-5754 (1) | Spectre V3 Meltdown | | nopti | https://www.suse.com/support/kb/doc/?id=7022512 |
| CVE-2018-3639 (2) | Spectre V4 | Y | nospec_store_bypass_disable | https://www.suse.com/security/cve/CVE-2018-3640/ |
| CVE-2018-3665 (2) | Lazy FPU | | eagerfpu=off | https://www.suse.com/support/kb/doc/?id=7023076 |

SUMMARY

Certain challenges presently exist. Existing solutions provide mechanisms for distribution and installation of security fixes for vulnerability control, and commercial tools are An advantage of the embodiments disclosed herein is that a system administrator can have an automatic way of determining the vulnerability level of any untrusted network node and having confidence that the determined vulnerability level is correct.

BRIEF DESCRIPTION OF THE DRAWINGS

The accompanying drawings, which are incorporated herein and form part of the specification, illustrate various embodiments.

FIG. 4 is a flowchart illustrating a process according to an embodiment.

DETAILED DESCRIPTION

Figure 1:
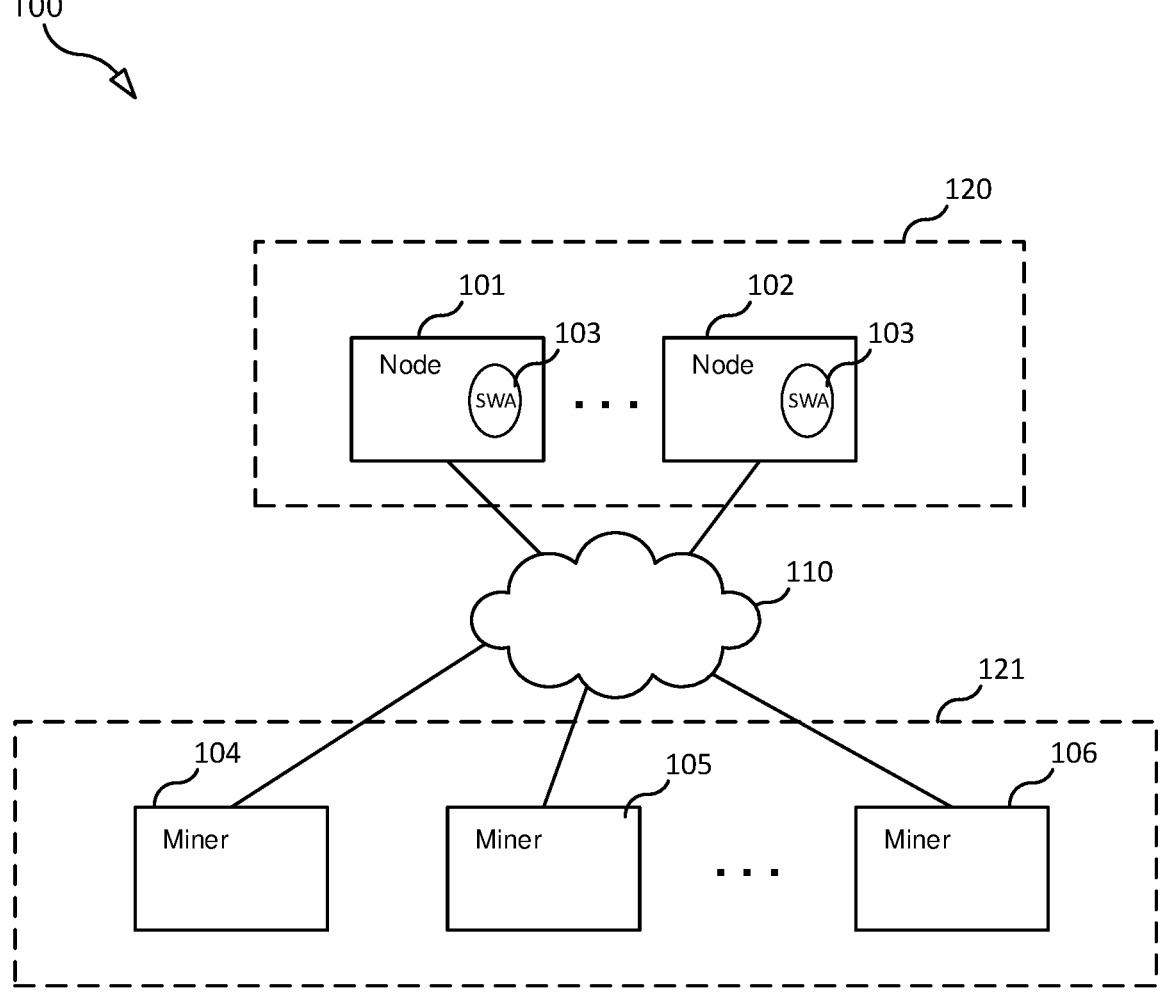
FIG. 1 illustrates a system according to an embodiment.

FIG. 1 illustrates a system 100 according to an embodiment. In the example shown, system 100 includes a number of network nodes (or just "nodes" for short). In the example illustrated two nodes are shown: node 101 and node 102, and these nodes are part of an untrusted public network 120. As used herein a "node" can be any physical computing device or virtual computing device (e.g., a virtual machine). System 100 also includes a number of security management nodes, which are also known herein as "Miners." In the example illustrated, three Miners are shown: Miner 104, Miner 105, and Miner 106, and the Miners 104-106 are part of a trusted zone 121.

In one embodiment, each network node has installed thereon a security application 103, which is referred to as a "Security Wallet Agent (SWA)." The SWA 103 may be installed on each node to be certified using a trusted installation method. For example, the process of installation of the SWA 103 on the network nodes can be performed using existing technologies such as Root of Trust, Security Certificates, and Security Enclaves. In some embodiments, an encrypted identifier (ID) of each SWA is registered in a distributed ledger (DL) (e.g., a Blockchain). In one embodiment, the SWA 103 is granted root privileges to the node on which it is installed and performs a periodic security scan of the node's operating system using state-of-art tools (e.g. Syxsense, Ivanti, GFI LAN Guard). This enables the SWA 103 to produce a patch report identifies the security patches that have been installed. This patch report can then be used by the Miners do determine a vulnerability level for the network node.

This disclosure describes various embodiments to assess and qualify the vulnerability level of the network nodes of system 100. In one embodiment, the methodology uses distributed ledger technology (DLT). Distributed ledgers use independent nodes to record, share and synchronize transactions in their respective electronic ledgers (instead of keeping data centralized as in a traditional ledger). In one embodiment a Blockchain (i.e., a DLT where blocks are appended with hash codes) is used advantageously to certify the security of the nodes and secure that their vulnerability level is approved via a distributed consensus mechanism. This disclosure describes the Vulnerability Level (VL) concept within the consensus mechanism, used in standard Blockchains, creating an innovative mechanism to certify the vulnerability level for each node.

The role of the SWA 103 is to request transactions to the DL in order to certify the vulnerability level of the respective node. The DL is initiated by assigning a vulnerability level to a subset of nodes (the Miners) possibly standing in a trusted zone using a certification authority (CA). During this step, the CA installs the state-of-art security patches and calculates the vulnerability level of the Miners. This information is stored in the DL as first blocks. This step can be performed using existing certification tools (e.g. Nexus). Each SWA 103 can leverage the well-known security protocols used by Bitcoin for the registration of the SWA and can support also virtualized SWA via a Wallet server.

The Miners are identified as the nodes with the lowest vulnerability level in a trusted area (e.g. secured "demilitarized-zone" (DMZ)), which can be geographically distributed. In an alternative embodiment the Miner role can be assumed by any node in the network with the lowest and certified VL. In some embodiments, a proof-of-stake method is used to select a Master Miner by calculating the vulnerability level of each Miner. Whenever a Miner is selected as Master Miner and propose a new block, it is assigned a feedback from the other Miners in order to prevent fraud among the Miners.

In one embodiment, each Miner may be assigned a Reputation value that corresponds to the Miner's vulnerability level. In alternative embodiments, a Miner's Reputation value can be based on a combination of vulnerability level and other factors such as the Miner consensus or the number of security patches installed. A Miner's Reputation value is increased whenever the Miner gets approval for its blocks (proof of confidence and transaction fee) or decreased when it fails to get its blocks approved. Miner Reputation can also be increased when a new patch level is installed and certified by an external certification authority.

In one embodiment, the vulnerability level (VL) of each node is determined based on the node's confidence level value, which can be derived, for example, from the below formula (but any other formula to achieve the same result can be used).

$$VL = \left( \frac{\sum_{i=1}^{n} w_i * CVE_i}{\sum_{i=1}^{n} w_i} \right) * 100$$

Where:

VL is the vulnerability level of the node;

n is the total number of CVE entries in a CVE list;

$w_i$ is a pre-defined weight for the i-th CVE entry in the CVE list;

$CVE_i$ is a Boolean value associated with the i-th CVE entry in the CVE list, wherein, in one embodiment, if the node has not installed the security patch for the i-th CVE, then $CVE_i=1$; otherwise $CVE_i=0$. In this embodiment, a higher VL value means the node is more vulnerable (i.e., less trustworthy) and a lower VL value means the node is less vulnerable (i.e., more trustworthy). In another embodiment, if the node has not installed the security patch for the i-th CVE, then $CVE_i=0$; otherwise $CVE_i=1$. In this embodiment, a lower VL value means the node is more vulnerable, and a higher VL means the node is more trustworthy (i.e., less vulnerable).

For each network node, each Miner calculates VL for the network node based on information about the security patches installed on the network node and information form a CVE list. Each Miner might have access to a different CVE list because each Miner may have a different CA. Thus, it is possible that not all Miners calculate the same VL value for a given untrusted network node.

Master Miner Role:

In one embodiment, the Miners are dedicated hosts within trusted network areas (e.g., area 121) within each operator network. The Miners can belong to different organizations and they communicate and validate each-other through a consensus protocol (e.g., a Blockchain protocol). The Miners are maintained aligned with respect to their respective Certification Authority (CA), so they have the latest available view of the security vulnerabilities.

In one embodiment, a Miner is selected randomly from among the Miners having at least a certain Reputation level. This selected Miner then functions as the "Master Miner," which means that it is in charge of processing the vulnerability classification requests from untrusted network nodes in the network (e.g., nodes 101 and 102). In this embodiment, because the Miners rely on a decentralized mechanism governed by a consensus mechanism, there is no risk of single point of failure or hacking by any of the operators.

Figure 2:
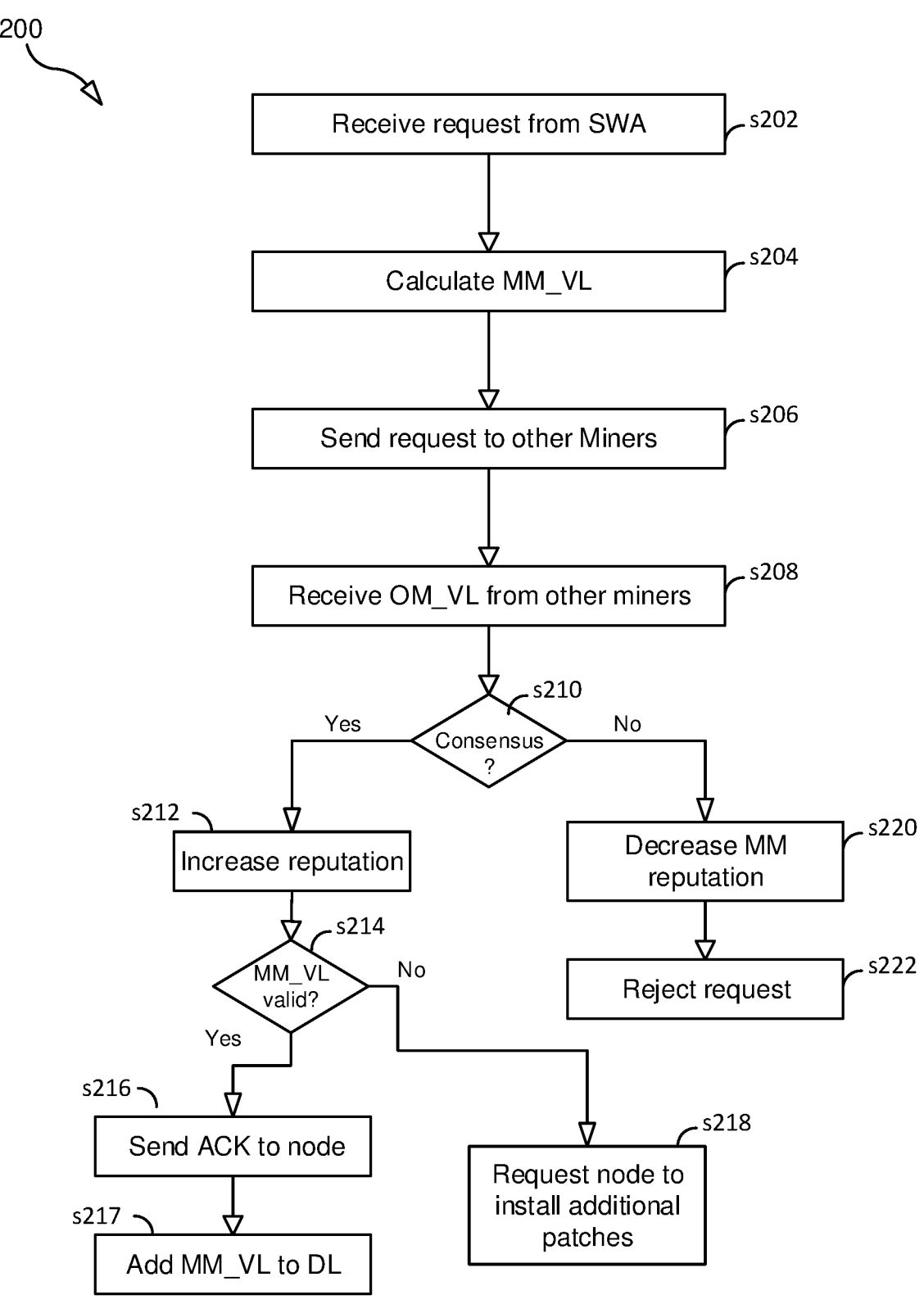
FIG. 2 is a flowchart illustrating a process according to an embodiment.
Figure 3:
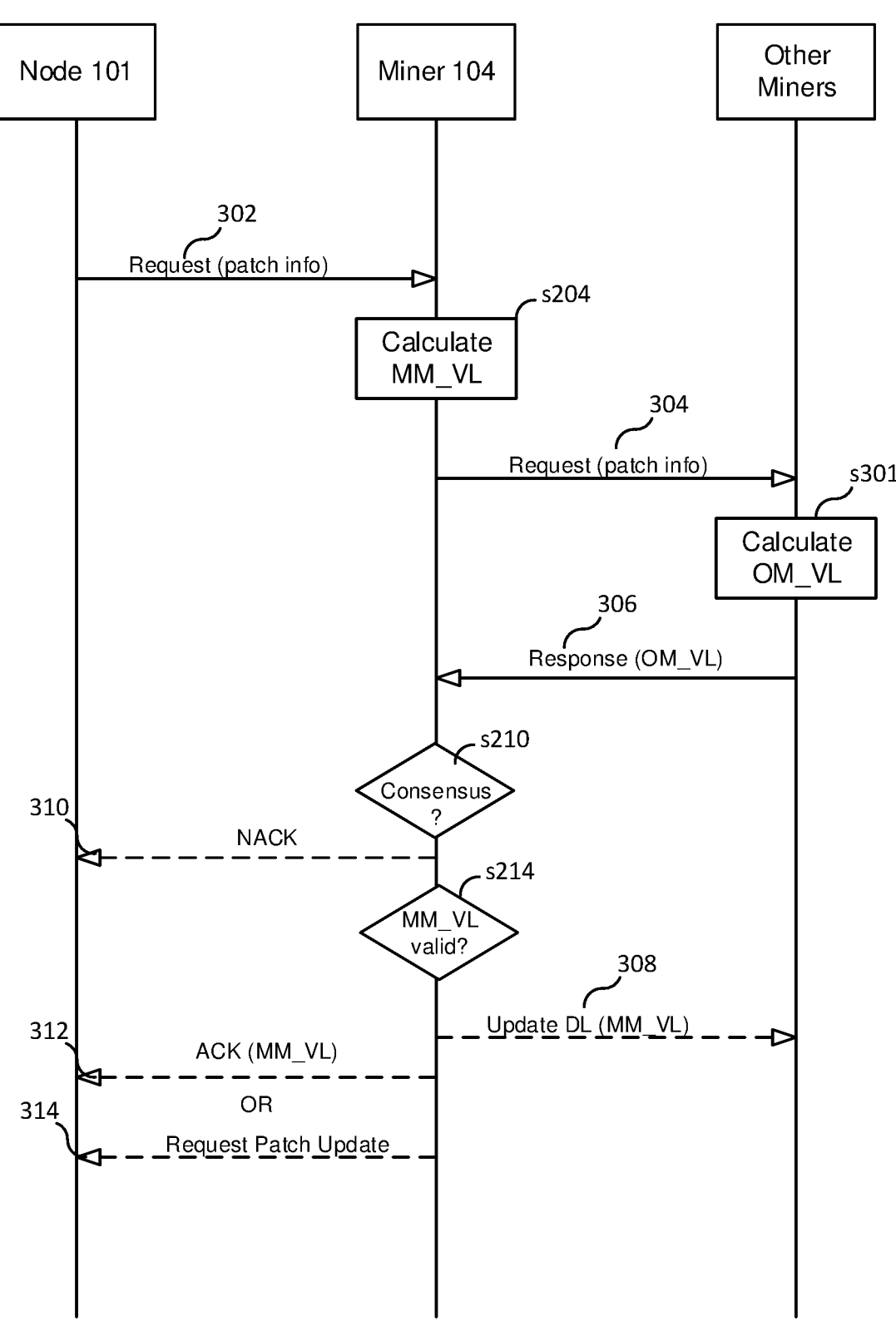
FIG. 3 is a message flow diagram according to an embodiment.

Accordingly, in one embodiment, process 200 shown in FIG. 2 is performed, which is also illustrated by the message flow diagram of FIG. 3. Process 200 may begin with step s202.

Step s202 comprises the Master Miner receiving from a network node (e.g. node 102) a VL certification request message 302 (see FIG. 3) containing: 1) certificate for the SWA installed on the node and 2) security patch information obtained by the SWA (e.g., a detailed report of the installed patches and their relevant hash code (calculated on the installed patches)). Upon receiving the request 302, the Master Miner calculates VL for the node (this VL value is referred to as MM_VL) (step s204) and then in step s206 the Master Miner sends to the other Miners a request 304 that includes the security patch information so that the other Miners can each calculate their own VL value for the network node (see step s301 in FIG. 3) (these other VL values are referred to as OM_VL). In step s208, the Master Miner receives the OM_VL values from the other Miners (see response 306 shown in FIG. 3). In step s210, the Master Miner determines whether a consensus is reached with respect to the VL value for the network node. In one embodiment, the consensus protocol is based on the new "Proof-of-Confidence" mechanism which is based on the recalculation of the vulnerability of the SW patch list within each other Miner. In one embodiment, a decision is made based on the majority (50%+1) of the Miners in the pool.

If consensus is reached, the Master Miner reputation is increased (step s212), and a determination is made as to whether the MM_VL value is valid (e.g., a determination is made as to whether MM_VL>T, where T is threshold) (steps 214). If MM_VL is valid (e.g., MM_VL>T), then the Master Miner 1) sends a positive acknowledgment (ACK) message 312 to the network node (step s216) and 2) adds MM_VL to the DL (step s217). For example, in step s217 the Master Miner sends to each Miner a message 308 that includes MM_VL and an instruction to update the DL so that the network node is recorded as having a VL of MM_VL (e.g., a record for the network node is updated to contain MM_VL). If MM_VL is not valid (e.g., MM_VL<T), then the Master Minder sends to the network node a request patch update message 314 that instructs the network node to install additional patches so that the network node can lower its vulnerability (step s218). If consensus is not reached, the Master Miner reputation is decreased (step s220) and the Master Miner sends a negative acknowledgement NACK message 310 to the network node (step s222). Upon receiving the NACK, the network node may resubmit the request and a new Master Miner may be selected.

FIG. 4 is a flowchart illustrating a process 400, according to some embodiments, for determining a vulnerability of a network node. Process 400 may begin in step s402.

Step s402 comprises a master security management node (a.k.a., "Master Miner") obtaining security patch information regarding one or more security patches installed on the network node.

Step s404 comprises the master security management node using the security patch information to determine a first vulnerability value for the network node (e.g., MM_VL).

Step s406 comprises the master security management node obtaining a set of other vulnerability values (e.g., a set of OM_VL values) for the network node, wherein each other vulnerability value was determined by different security management node.

Step s408 comprises the master security management node determining, based on the set of other vulnerability values, whether a consensus regarding the vulnerability level of the network node has been reached. If the master security management node determines that a consensus regarding the vulnerability level of the network node has been reached, then the first vulnerability value is assigned to the network node.

In some embodiments obtaining the security patch information comprises receiving a vulnerability level request message transmitted by the network node, the vulnerability level request message comprising the security patch information.

In some embodiments the process also includes determining a reputation value for each security management node included in a group of security management nodes and using the reputation values to select from the group of security management nodes a particular one of the security management node to function as the master security management node. In some embodiments the process also includes reducing the reputation of the master security management node when the consensus has not been reached.

In some embodiments the set of other vulnerability values consists of N vulnerability values, and determining whether a consensus has been reached comprises: determining whether at least a threshold number of the other vulnerability values is equal to or less than the first vulnerability value, or determining whether at least a threshold number of the other vulnerability values is equal to or greater than the first vulnerability value.

In some embodiments the set of other vulnerability values consists of N vulnerability values, and determining whether a consensus has been reached comprises determining whether at least a threshold number of the other vulnerability values is equal to the first vulnerability value. In some embodiments the process also includes, as a result of determining that at least the threshold number of the other vulnerability values is equal to the first vulnerability value, increasing a reputation of the master security management node.

In some embodiments the set of other vulnerability values consists of N vulnerability values, and determining whether a consensus has been reached comprises determining whether at least a threshold number of the other vulnerability values is greater than or less than the first vulnerability value. In some embodiments the process also includes, as a result of determining that at least the threshold number of the other vulnerability values is greater than or less than the first vulnerability value, decreasing a reputation of the master security management node.

In some embodiments the threshold number is equal to N/2+1.

In some embodiments assigning the first vulnerability value to the network node comprises the master security management node recording the first vulnerability value in a first data store. In some embodiments assigning the first vulnerability value to the network node further comprises the master security management node triggering each different security management node to record the first vulnerability value in a different data store. In some embodiments triggering each different security management node to record the first vulnerability value in a different data store comprise broadcasting a message comprising the first vulnerability value and an identifier assigned to the network node.

In some embodiments a security wallet agent is stored on the network node and is configured to obtain the security patch information and transmit the vulnerability level request message.

Figure 5:
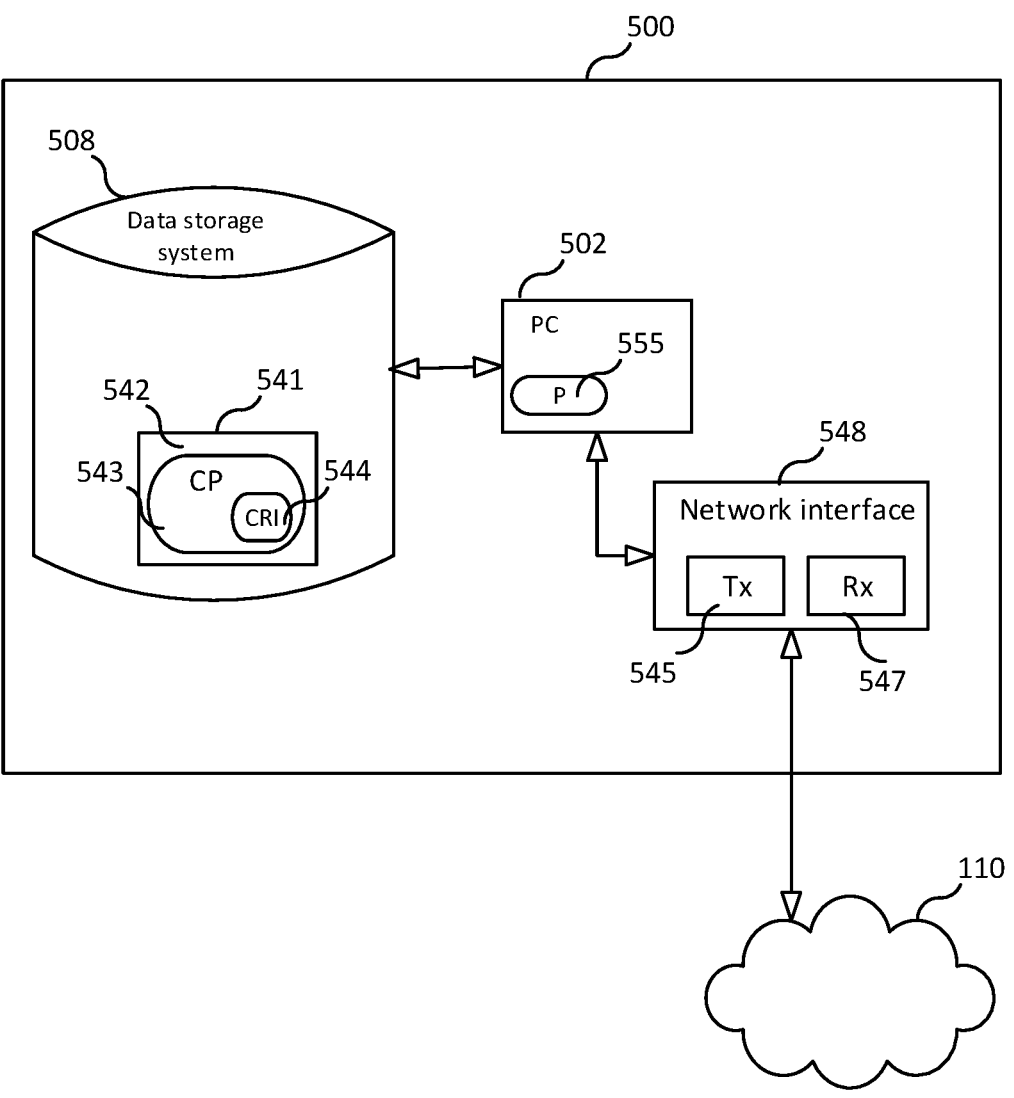
FIG. 5 is a block diagram of a security management node according to an embodiment.

FIG. 5 is a block diagram of security management node 500 (which can implement any of the Miners disclosed herein), according to some embodiments. As shown in FIG. 5, security management node 500 may comprise: processing circuitry (PC) 502, which may include one or more processors (P) 555 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., security management node 500 may be a distributed computing apparatus); at least one network interface 548 (e.g., a physical interface or air interface) comprising a transmitter (Tx) 545 and a receiver (Rx) 547 for enabling security management node 500 to transmit data to and receive data from other nodes connected to a network 110 (e.g., an Internet Protocol (IP) network) to which network interface 548 is connected (physically or wirelessly) (e.g., network interface 548 may be coupled to an antenna arrangement comprising one or more antennas for enabling security management node 500 to wirelessly transmit/receive data); and a local storage unit (a.k.a., "data storage system") 508, which may include one or more non-volatile storage devices and/or one or more volatile storage devices. In embodiments where PC 502 includes a programmable processor, a computer program product (CPP) 541 may be provided. CPP 541 includes a computer readable medium (CRM) 542 storing a computer program (CP) 543 comprising computer readable instructions (CRI) 544. CRM 542 may be a non-transitory computer readable medium, such as, magnetic media (e.g., a hard disk), optical media, memory devices (e.g., random access memory, flash memory), and the like. In some embodiments, the CRI 544 of computer program 543 is configured such that when executed by PC 502, the CRI causes security management node 500 to perform steps described herein (e.g., steps described herein with reference to the flow charts). In other embodiments, security management node 500 may be configured to perform steps described herein without the need for code. That is, for example, PC 502 may consist merely of one or more ASICs. Hence, the features of the embodiments described herein may be implemented in hardware and/or software.

Cloud Implementation

The embodiments can be deployed in Cloud environment where the network function virtualization (NFV) processes and the network slices need to be deployed on a trusted and certified network. For the scope of the embodiments, reference can be made to European Telecommunication Standards Institute (ETSI) GS NFV-SEC 013 V 3.1.1 (2017-02)

where NFV environment is segmented in multiple trust domains and a common classification of vulnerability level can be advantageously deployed to coordinate the Security Management across Trust domains. Additionally, the embodiments can be advantageously used in a federated NFV deployment where multiple ETSI Management and Orchestration (MANO) functions need to collaborate without requiring any exchange of the local data.

CONCLUSION AND ADVANTAGES

As described above, an innovative methodology is used to certify the vulnerability of a set of nodes (physical and virtual) using a set of Miners. That is, for example, a decentralized consensus method is used to certify the vulnerability level of a multitudes of nodes (e.g., nodes in a multi-tenant and multi-domain network). In this way it is possible to deploy security sensitive applications on nodes with compatible security level and steer NFV functions depending on the host classification.

Additionally, the network will advantageously converge to the lowest vulnerability level thanks to a distributed and non-centralized mechanism to push the nodes towards the highest patch level that is certified by the Miners. Miners compete to achieve the highest confidence level thanks to the distributed consensus algorithm that rewards agreed decisions and penalizes decisions against most of the Miners, so preventing any fraud or distributed denial of service (DDOS) attack.

The embodiments described herein can be advantageously adopted in Cloud deployment as a method for network slicing as it introduces a certified method to classify the cloud resources belonging to each slice.

Also, the embodiments can be advantageously adopted in a Cloud Radio Access Network (RAN) where the network function virtualization (NFV) processes run on commercial, off-the-shelf (COTS) servers. In this case a distributed vulnerability certification is required in order to support multivendor interoperability across an Open RAN architecture.

Further, the embodiments can be used advantageously in a multi-tenant network in order to coordinate the Trust Domain management across different Operators by ensuring there is a decentralized and majority-based consensus on the vulnerability levels among different operators. In this way any network slice crossing different operator networks can be assigned to resources with common and agreed vulnerability criteria.

While various embodiments are described herein, it should be understood that they have been presented by way of example only, and not limitation. Thus, the breadth and scope of this disclosure should not be limited by any of the above described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for determining a vulnerability level of a network node, the method comprising:

a master security management node obtaining security patch information regarding one or more security patches installed on the network node;

the master security management node using the security patch information to determine a first vulnerability value for the network node;

the master security management node obtaining a set of M other vulnerability values for the network node, wherein M is greater than 1 and each other vulnerability value was determined by a different security management node;

the master security management node determining, based on the set of M other vulnerability values, whether or not a consensus regarding the vulnerability level of the network node has been reached; and as a result of determining that the consensus has been reached, the master security management node assigning the first vulnerability value to the network node.

2. The method of claim 1, wherein obtaining the security patch information comprises receiving a vulnerability level request message transmitted by the network node, the vulnerability level request message comprising the security patch information.

3. The method of claim 2, wherein a security wallet agent is stored on the network node and is configured to obtain the security patch information and transmit the vulnerability level request message.

4. The method of claim 1, further comprising determining a reputation value for each security management node included in a group of security management nodes; and using the reputation values to select from the group of security management nodes a particular one of the security management node to function as the master security management node.

5. The method of claim 4, further comprising reducing the reputation of the master security management node when the consensus has not been reached.

6. The method of claim 1, wherein determining whether or not a consensus has been reached comprises:

determining whether at least a threshold number of the Mother vulnerability values is equal to the first vulnerability value, or determining whether at least a threshold number of the M other vulnerability values is greater than the first vulnerability value, or determining whether at least a threshold number of the M other vulnerability values is less than the first vulnerability value.

7. The method of claim 6, further comprising, as a result of determining that at least the threshold number of the M other vulnerability values is equal to the first vulnerability value, increasing a reputation of the master security management node.

8. The method of claim 6, further comprising, as a result of determining that at least the threshold number of the M other vulnerability values is greater than or less than the first vulnerability value, decreasing a reputation of the master security management node.

9. The method of claim 6, wherein the threshold number is equal to M/2+1.

10. The method of claim 1, wherein assigning the first vulnerability value to the network node comprises the master security management node recording the first vulnerability value in a first data store.

11. The method of claim 10, wherein assigning the first vulnerability value to the network node further comprises the master security management node triggering each different security management node to record the first vulnerability value in a different data store.

12. The method of claim 11, wherein triggering each different security management node to record the first vulnerability value in a different data store comprise broadcasting a message comprising the first vulnerability value and an identifier assigned to the network node.

13. A non-transitory computer readable storage medium storing a computer program comprising instructions which when executed by processing circuitry of a security management node, causes the security management node to perform the method of claim 1.

14. The method of claim 1, wherein the method further comprises, as a result of determining that the consensus has been reached, determining whether or not the first vulnerability value is valid, and determining whether or not the first vulnerability value is valid comprises determining whether the first vulnerability value is greater than a threshold or determining whether the first vulnerability value is not less than a threshold.

15. The method of claim 14, wherein the master security management node assigns the first vulnerability value to the network node based on a determination that the first vulnerability value is valid.

16. The method of claim 1, wherein the method further comprises, as a result of determining that the consensus has been reached, increasing a reputation value of the master security management node.

17. A security management node, the security management node comprising:

processing circuitry; and a memory, the memory containing instructions executable by the processing circuitry, whereby the security management node is operative to perform a method comprising:

obtaining security patch information regarding one or more security patches installed on a network node;

using the security patch information to determine a first vulnerability value for the network node;

obtaining a set of M other vulnerability values for the network node, wherein M is greater than 1 and each other vulnerability value was determined by a different security management node;

determining, based on the set of M other vulnerability values, whether or not a consensus regarding the vulnerability level of the network node has been reached; and as a result of determining that the consensus has been reached, the master security management node assigning the first vulnerability value to the network node.

18. The security management node of claim 17, wherein obtaining the security patch information comprises receiving a vulnerability level request message transmitted by the network node, the vulnerability level request message comprising the security patch information.

19. The security management node of claim 17, wherein the method further comprises:

determining a reputation value for each security management node included in a group of security management nodes; and using the reputation values to select from the group of security management nodes a particular one of the security management node to function as a master security management node.

20. The security management node of claim 19, wherein the method further comprises reducing the reputation of the master security management node when the consensus has not been reached.

21. The security management node of claim 17, wherein determining whether or not a consensus has been reached comprises:

determining whether at least a threshold number of the M other vulnerability values is equal to the first vulnerability value, or determining whether at least a threshold number of the M other vulnerability values is greater than the first vulnerability value, or determining whether at least a threshold number of the Mother vulnerability values is less than the first vulnerability value.

22. The security management node of claim 21, wherein the method further comprises, as a result of determining that at least the threshold number of the Mother vulnerability values is equal to the first vulnerability value, increasing a reputation of a master security management node.

23. The security management node of claim 21, wherein the method further comprises, as a result of determining that at least the threshold number of the M other vulnerability values is greater than or less than the first vulnerability value, decreasing a reputation of the security management node.

\*    \*    \*    \*    \*